United States Patent
Metuki et al.

(10) Patent No.: US 12,169,959 B2
(45) Date of Patent: Dec. 17, 2024

(54) FILTERING OF KEYPOINT DESCRIPTORS BASED ON ORIENTATION ANGLE

(71) Applicant: Apple Inc., Cupertino, CA (US)

(72) Inventors: Assaf Metuki, Moshav Herut (IL); Lukas Polok, Cupertino, CA (US); Danny Gal, Hod-Hasharon (IL); Liran Fishel, Raanana (IL)

(73) Assignee: APPLE INC., Cupertino, CA (US)

( * ) Notice: Subject to any disclaimer, the term of this patent is extended or adjusted under 35 U.S.C. 154(b) by 356 days.

(21) Appl. No.: 17/693,007

(22) Filed: Mar. 11, 2022

(65) Prior Publication Data

US 2023/0316706 A1    Oct. 5, 2023

(51) Int. Cl.
*G06F 17/00* (2019.01)
*G06V 10/74* (2022.01)
*G06V 10/75* (2022.01)

(52) U.S. Cl.
CPC .......... *G06V 10/757* (2022.01); *G06V 10/761* (2022.01)

(58) Field of Classification Search
CPC .......................... G06V 10/757; G06V 10/761
See application file for complete search history.

(56) References Cited

U.S. PATENT DOCUMENTS

| | | | | |
|---|---|---|---|---|
| 8,885,901 | B1 * | 11/2014 | Solanki | G16H 30/40 382/128 |
| 9,229,956 | B2 * | 1/2016 | Ke | G06F 16/532 |
| 9,665,790 | B2 * | 5/2017 | Gutelzon | G06T 7/11 |
| 9,672,409 | B2 * | 6/2017 | Jonsson | G06V 40/1359 |

(Continued)

FOREIGN PATENT DOCUMENTS

| | | |
|---|---|---|
| CN | 103679193 A | 3/2014 |
| CN | 107369170 A | 11/2017 |

(Continued)

OTHER PUBLICATIONS

Mousavi et al., A Two-Step Descriptor-Based Keypoint Filtering Algorithm for Robust Image Matching, Feb. 2022, IEEE, 21 pages (Year: 2022).*

(Continued)

*Primary Examiner* — Mohammed H Zuberi
(74) *Attorney, Agent, or Firm* — Sterne, Kessler, Goldstein & Fox P.L.L.C.

(57) ABSTRACT

Embodiments of the present disclosure relate to selecting a subset of keypoint descriptors of two images for match operation based on their orientation angles indicated in headers of the keypoint descriptors. The keypoint descriptors in the two images are matched by first comparing their headers and then performing vector distance determination. During the header comparison operation, a header of a descriptor of a first image is compared only with headers of keypoint descriptors of a second image in a discrete orientation angle range corresponding to an orientation angle indicated by the header of the first image descriptor or keypoint descriptors of the second image in adjacent discrete orientation angle ranges. After the headers of the keypoint descriptors satisfying one or more matching criteria are determined, distance determination operations are performed between the keypoint descriptors while the remaining keypoint descriptors are discarded without determining their distances.

20 Claims, 9 Drawing Sheets

(56) References Cited

U.S. PATENT DOCUMENTS

| | | |
|---|---|---|
| 10,528,847 B2 | 1/2020 | Ben Himane et al. |
| 10,997,746 B2 | 5/2021 | He et al. |
| 11,189,000 B2 | 11/2021 | Neela et al. |
| 11,210,573 B2 | 12/2021 | Wiacek et al. |
| 2014/0201200 A1* | 7/2014 | Li .................. G06V 10/761 707/723 |
| 2015/0310306 A1* | 10/2015 | Song ................ G06V 10/75 382/159 |
| 2020/0125884 A1 | 4/2020 | Sung |

FOREIGN PATENT DOCUMENTS

| | | |
|---|---|---|
| CN | 111652306 A | 9/2020 |
| WO | WO 2020/084273 A1 | 4/2020 |

OTHER PUBLICATIONS

Pham et al., Feature Descriptors: a Review of Multiple Cues Approaches, 2016, IEEE, 6 pages (Year: 2016).*

Kalms, L. et al., "Efficient Pattern Recognition Algorithm Including a Fast Retina Keypoint FPGA Implementation," 2019 29th International Conference on Field Programmable Logic and Applications (FPL), Sep. 2019, pp. 121-128.

* cited by examiner

FILTERING OF KEYPOINT DESCRIPTORS BASED ON ORIENTATION ANGLE

BACKGROUND

1. Field of the Disclosure

The present disclosure relates to a circuit for processing images and more specifically to determining matching keypoints in images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are implemented as a hardware component separate from the CPU and dedicated to perform one or more image processing algorithms.

Some processing of image data involves detecting of keypoints in the images. Keypoints are distinctive features in an image, and are associated with corresponding descriptors. Determining matching of keypoints in different images are typically performed by the CPU. Based on detected keypoints, various subsequent operations such as warping of images may be performed.

SUMMARY

Embodiments relate to filtering keypoint descriptors of an image to be compared with keypoint descriptors of another image based on their orientation angles by selecting a subset of keypoint descriptors of the image with headers that indicate the same range of orientation angles or adjacent ranges of the orientation angles as the keypoint descriptors of the other image being compared. Distances between the selected keypoint descriptors are then determined. By determining the distances associated with selected keypoint descriptors of the second image, computation associated with determining matching keypoint descriptors in the images may be reduced.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to selecting a subset of keypoint descriptors of two images for match operation based on their orientation angles indicated in headers of the keypoint descriptors. The keypoint descriptors in the two images are matched by first comparing their headers and then performing vector distance determination. During the header comparison operation, a header of a descriptor of a first image is compared only with headers of keypoint descriptors of a second image in a discrete orientation angle range corresponding to an orientation angle indicated by the header of the first image descriptor or keypoint descriptors of the second image in adjacent discrete orientation angle ranges. After the headers of the keypoint descriptors satisfying one or more matching criteria are determined, distance determination operations are performed between the keypoint descriptors while the remaining keypoint descriptors are discarded without determining their distances.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input.

The electronic device may also include one or more other physical user-interface devices, such as a physical keyboard, a mouse and/or a joystick.

Figure 1:
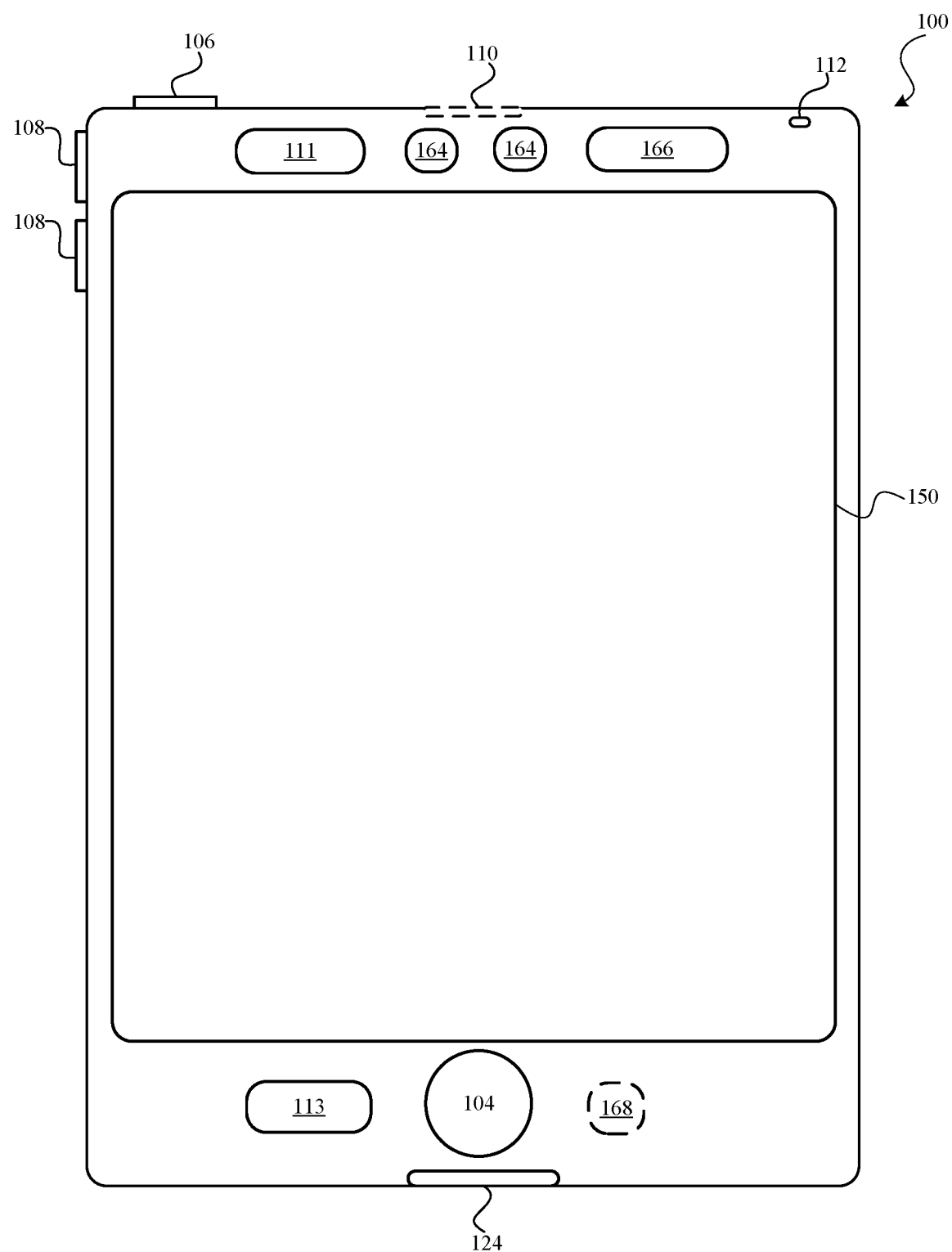
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition, or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
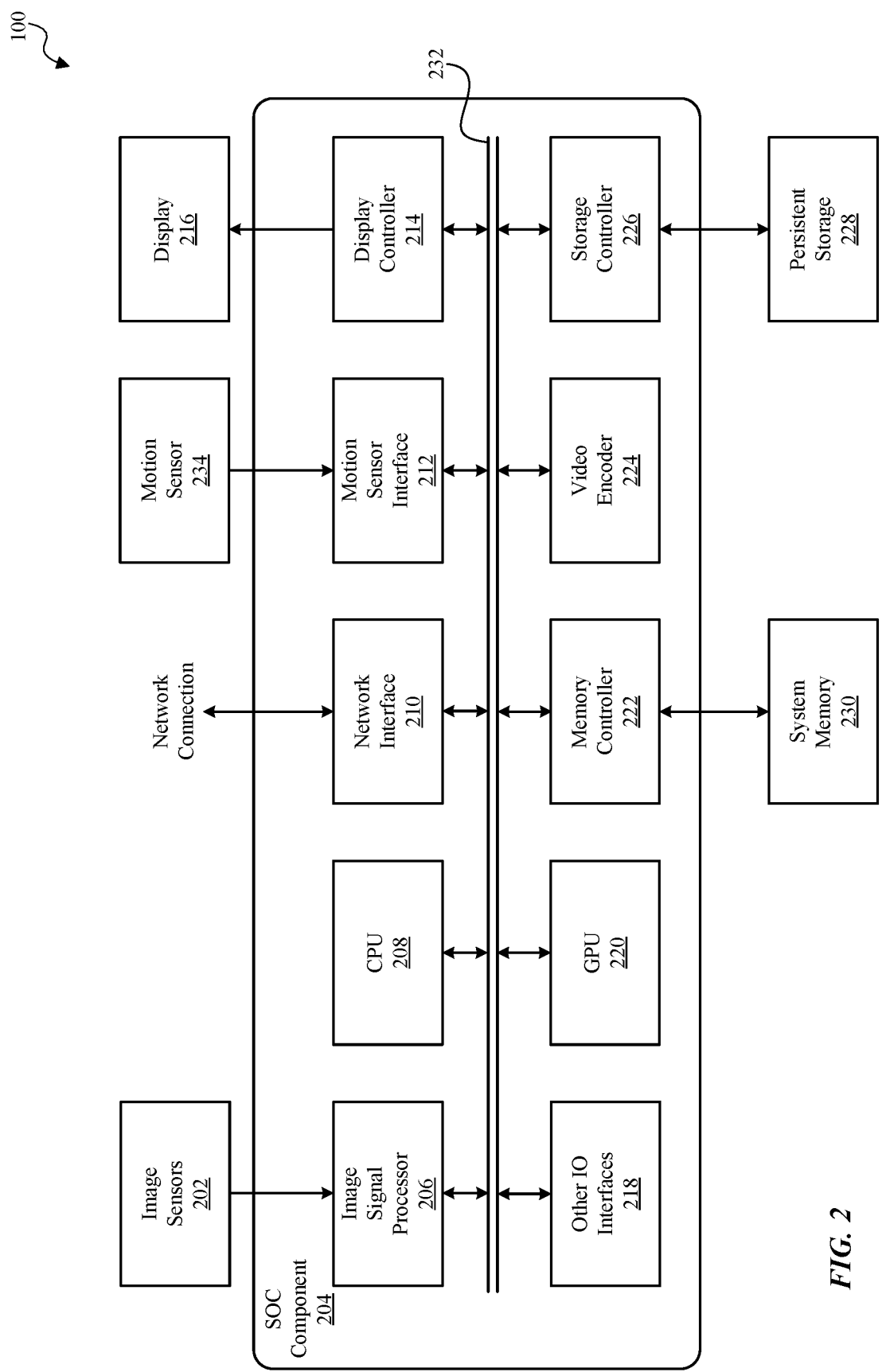
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
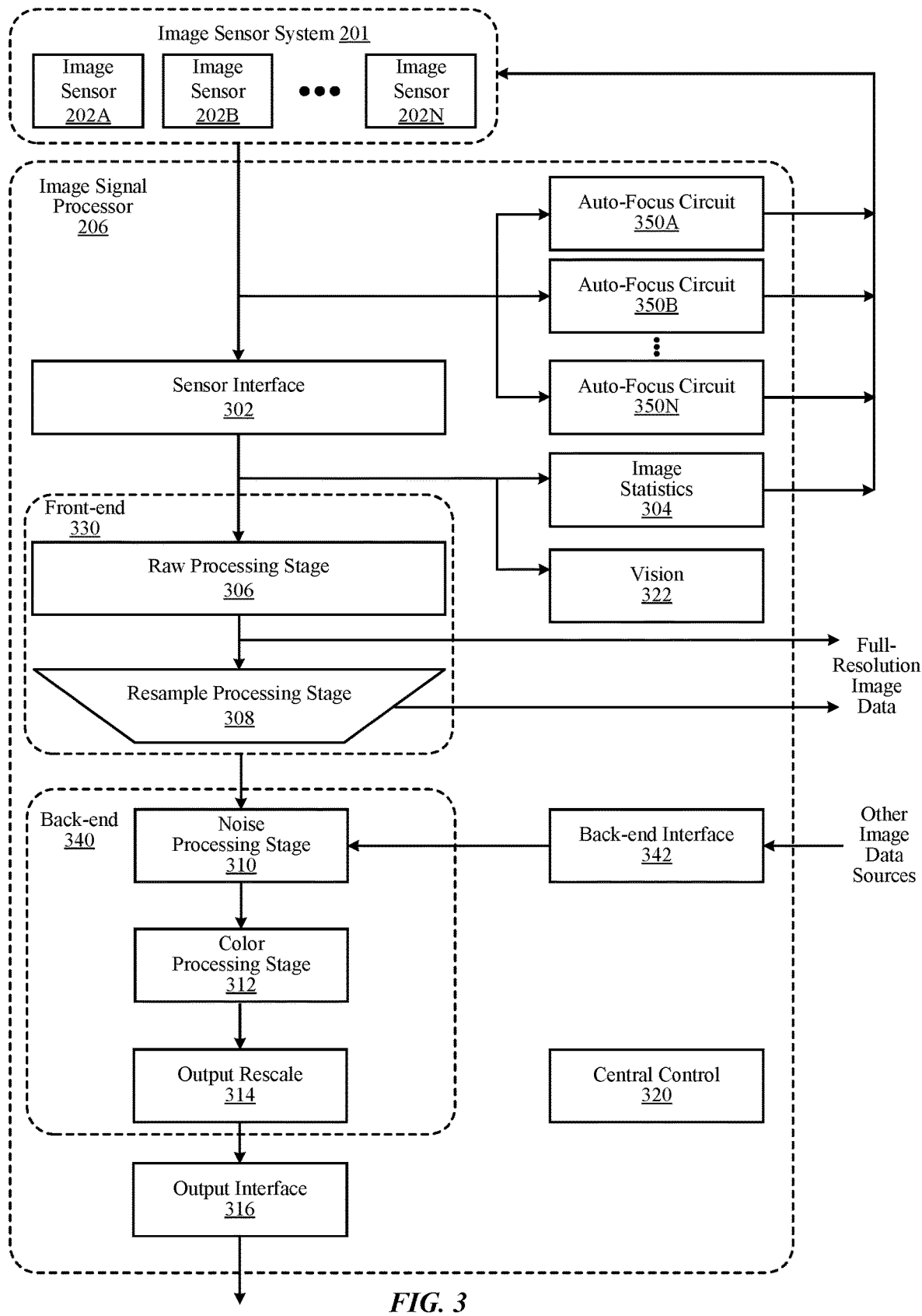
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include focus pixels that are used for auto-focusing and image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCbCr format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Vision Module Architecture for Keypoint Processing

Figure 4:
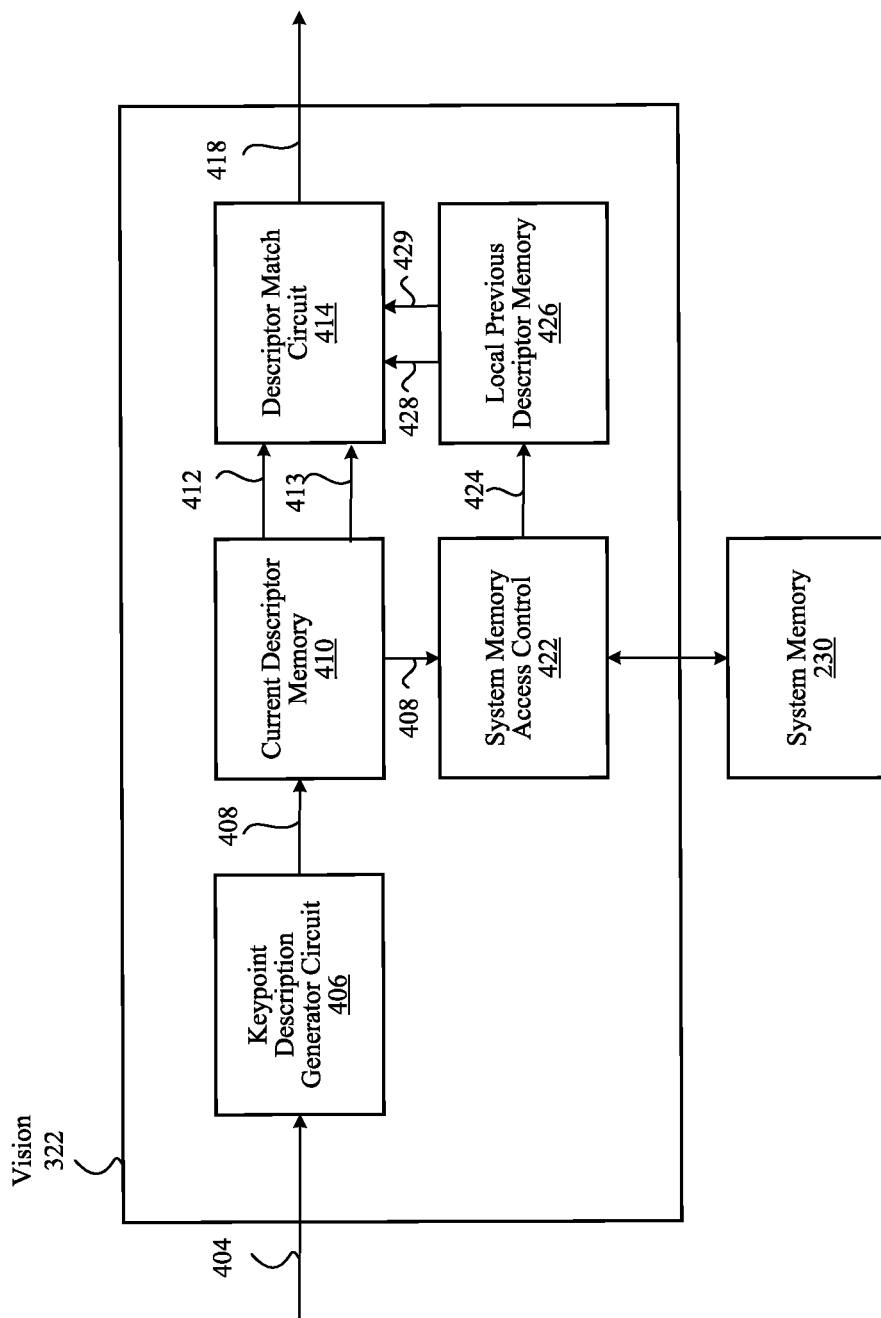
FIG. 4 is a block diagram illustrating a vision module of the image signal processor, according to one embodiment.

FIG. 4 is a block diagram illustrating vision module 322 of image signal processor 206, according to one embodiment. Vision module 322 may include, among other components, a keypoint descriptor generator circuit 406, current descriptor memory 410, descriptor match circuit 414, system memory access control module 422, and local previous descriptor memory 426. Vision module 322 may include further components not illustrated in FIG. 4. Such components omitted include, among others, components for generating HOG and performing NCC operations.

Keypoint description generator circuit 406 is a circuit that receives a version of a current image 404, detects keypoints in the current image 404, and generates keypoint descriptors 408 corresponding to the detected keypoints. The version of current image 404 may be a pre-processed version of an image captured by one of image sensors 202A through 202N or an image stored and received from system memory 230. Keypoint descriptor generator circuit 406 may execute various keypoint detection algorithms including, but not limited to, Fast Retina Keypoint (FREAK) algorithm. Such keypoint detection and keypoint description generation are well known, and hence, description thereof is omitted herein for the sake of brevity.

In one or more embodiments, keypoint descriptor generator circuit 406 may be fed with a pyramid of current image 404 for performing keypoint detection on different levels of the image pyramid. As a result of its operation, keypoint description generator circuit 406 generates the keypoint descriptors 408. Each of the keypoint descriptors include a header and a descriptor vector.

A keypoint descriptor may include a header and a descriptor vector. The header may include one or more of: (i) locations of the feature in the current or previous image, (ii) orientation angles of the keypoint, and (iii) the scale in the image pyramid where the keypoint was identified. The descriptor vector indicates comparison result on intensity of multiple patches of images at or around a corresponding keypoint.

Current descriptor memory 410 is a circuit that stores keypoint descriptors 408 of keypoints in a current image, as generated by keypoint descriptor generator circuit 406. The keypoint descriptors 408 may be classified according to their orientation angles and stored in corresponding data bins, as described below in detail with reference to FIG. 6.

Descriptor match circuit 414 receives headers and descriptor vectors of keypoint descriptors of current image 404 from current descriptor memory 410 and headers and descriptor vectors of keypoint descriptors of a previous image from local previous descriptor memory 426, and determines a list 418 of matching keypoints in current image 404 and the previous image. Specifically, descriptor match circuit 414 receives descriptor headers 412 of current image 404 and descriptor headers of previous image to select a subset of keypoints in current image 404 and the previous image, and then receives descriptor vectors 413, 429 of the selected keypoints for hamming distance determination, as described below in detail with reference to FIG. 5. In one or more embodiments, list 418 include bi-directionally matched keypoints.

System memory access control 422 is a circuit that controls writing or reading of keypoint descriptors to or from system memory 230. In one or more embodiments, system memory access control 422 is embodied as a direct memory access (DMA) circuit. System memory access control 422 reads keypoint descriptors 424 of a previous image and sends keypoint descriptors 424 to local previous descriptor memory 426 for storing. Further, system memory access control 422 writes keypoint descriptors 408 of current image 404 to system memory 230 during a cycle so that these keypoint descriptors 408 may be retrieved as keypoint descriptors of a previous image in a subsequent cycle. In one or more embodiments, the data structure associated with the keypoint descriptors 408 as stored in current descriptor memory 410 is retained when copying the keypoint descriptors 408 to system memory 230.

Local previous descriptor memory 426 is a circuit that stores a predetermined number of keypoint descriptors 424 received from system memory 230 via system memory access control 422. To reduce memory footprint, local previous description memory 426 may have a limited memory size to store fewer than the entire keypoint descriptors of the previous image. Hence, a set of keypoint descriptors fewer than a set number may be stored at a time in the local previous descriptor memory 426 for access by descriptor match circuit 414. Furthermore, system memory access control 422 may read the same keypoint descriptors 424 of the previous image only once, as described below in detail with reference to FIGS. 7A and 7B, to reduce memory traffic associated with reading the keypoint descriptors 424 of the prior image from system memory 230.

Although current descriptor memory 410 and local previous descriptor memory 426 are described as being separate components, these memories may part of shared memory. Further, system memory access control 422 may be located outside vision module 322 and be shared with other components of ISP 206.

Example Descriptor Match Circuit Architecture

Figure 5:
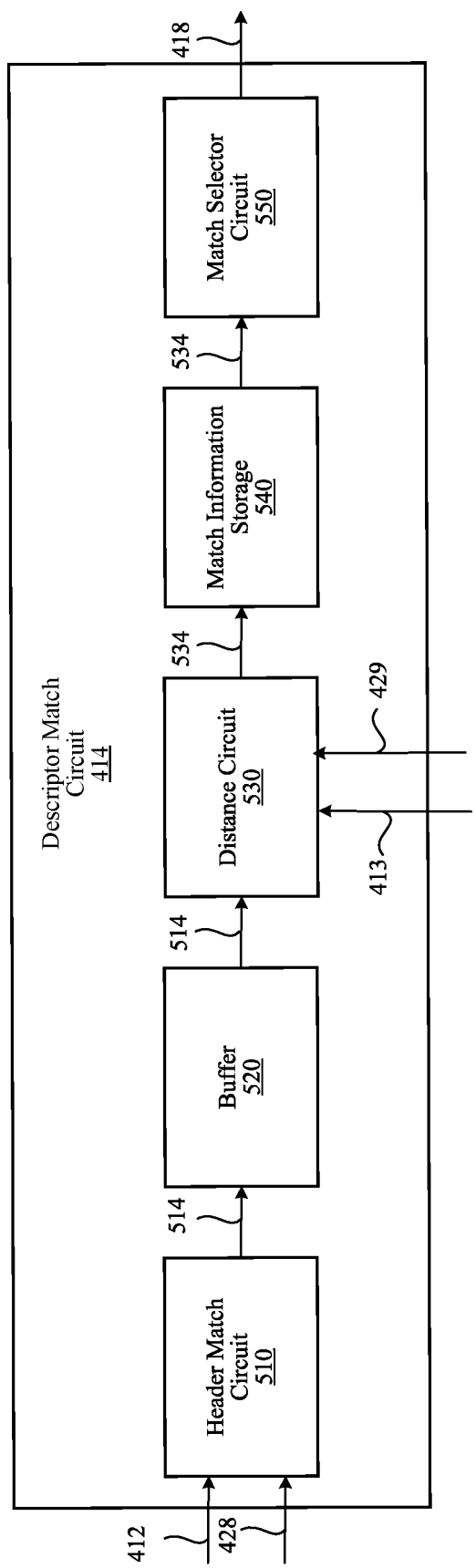
FIG. 5 is a block diagram of a descriptor match circuit of the vision module, according to one embodiment.

FIG. 5 is a block diagram of descriptor match circuit 414 of vision module 322, according to one embodiment. Descriptor match circuit 414 may include, among other components, header match circuit 510, buffer 520, distance circuit 530, match information storage 540 and match selector circuit 550. Descriptor match circuit 414 may include other components not illustrated in FIG. 5. The descriptor match circuit 414 first preforms comparison of headers of the keypoint descriptors, and subsequently performs distance determination for keypoints that pass the header comparison.

Header match circuit 510 fetches keypoint headers 412 of the current image from current descriptor memory 410 and determines if the keypoint headers 412 satisfy one or more match criteria associated with keypoint headers 428 of the previous image. Header match circuit 510 loads a keypoint header of the previous image, and compares it against each keypoint header of the current image using one or more match criteria to determine the likelihood that the keypoints match. Header match circuit 510 sends pointers 514 to the subset of keypoints to buffer 520 for access by distance circuit 530. Hence, only a subset of keypoints with matching counterparts are processed by distance circuit 530 for computationally intensive distance determining operations.

The one or more match criteria are used to make preliminary determination on whether a keypoint of the current image is likely to match one of keypoints of the previous image. Such criteria may include, among others, (I) whether the location of the keypoint in the current image is within a spatial distance from locations of keypoints in the previous image, (ii) whether orientation angles of keypoint in the current image is within a certain range of keypoints in the previous image, (iii) whether a scale of the image pyramid of the current image at which keypoint was detected corresponds to the same scales or adjacent scales at which the keypoints in the previous image were identified, and (iv) whether the type of the keypoint in the current image (e.g., local minimum or local maximum) corresponds to the same type of keypoint in the previous image.

Not all keypoint headers of the current image are loaded for header comparison a keypoint in the previous image by header match circuit 510. To render the process of header matching more efficient, the keypoints of the current image may be classified and stored in data bins where each data bin covers a discrete range of orientation angles. When a keypoint header of the previous image is loaded onto the header match circuit 510, only headers of keypoints of the current image having certain orientation angles are loaded onto the header match circuit 510 for header match operation.

Figure 6:
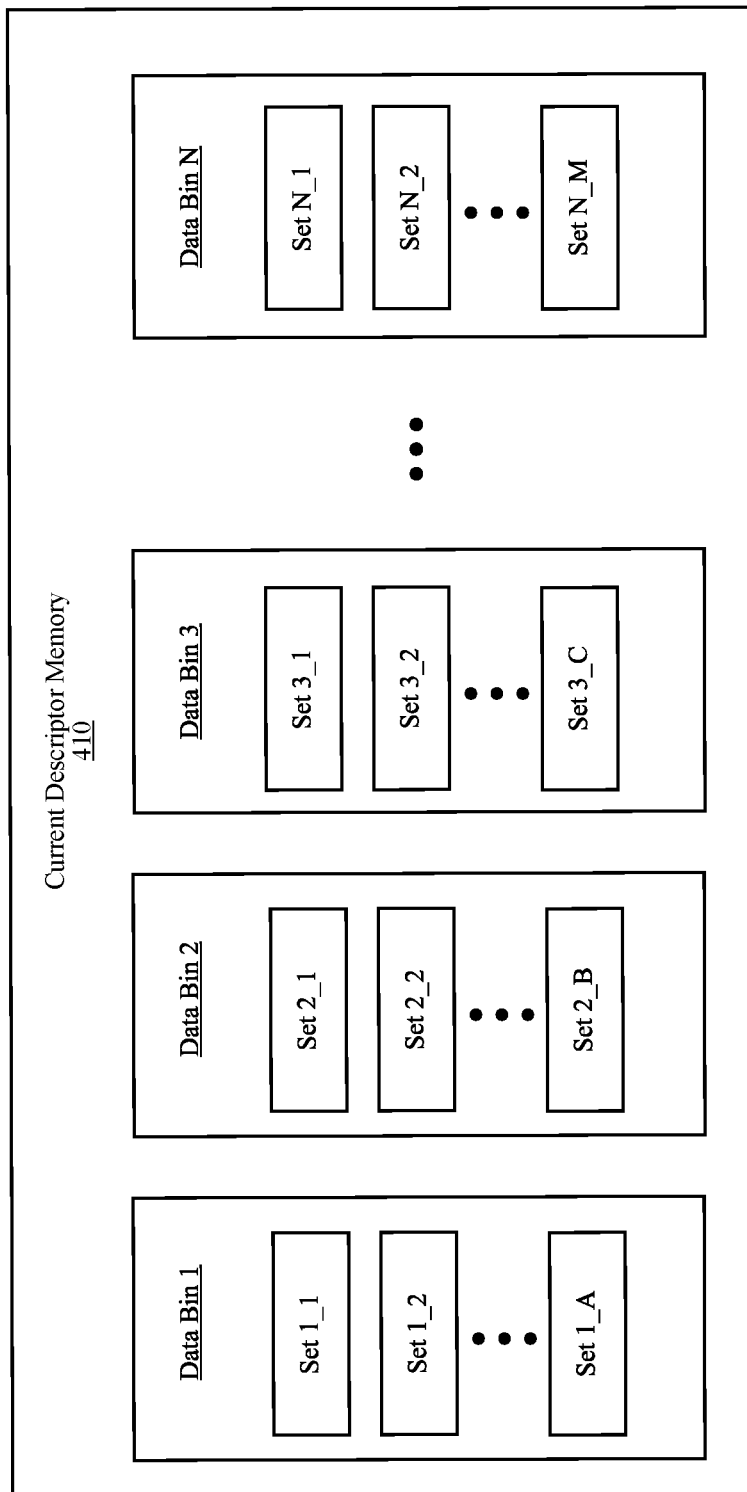
FIG. 6 is a block diagram of keypoint descriptors stored in a current descriptor memory of the descriptor match circuit, according to one embodiment.

FIG. 6 is a block diagram of keypoint descriptors stored in current descriptor memory 410, according to one embodiment. The current descriptor memory 410 may store sets of keypoint descriptors into different data bins 1 through N. Each data bin covers discrete ranges of orientation angles with a predetermined angle increment. For example, data bin 1 includes keypoint descriptors with orientation angles over 0 degrees and not over 45 degrees, data bin 2 includes keypoint descriptors with orientation angles over 45 degrees and not over 90 degrees, data bin 3 includes keypoint descriptors with orientation angles over 90 degrees and not over 135 degrees, etc.

Further, each data bin may store up to a predetermined number of keypoint descriptors in a set where the predetermined number corresponds to the number of keypoint descriptors that may be stored in local previous descriptor memory 426. In this way, the keypoint descriptors of the current image generated in a cycle may be retrieved in units of the set in a subsequent cycle where the same keypoint descriptors are used as keypoint descriptors of the previous image.

After keypoint description generation circuit 406 generates a keypoint description, it is added to a set of a corresponding data bin according to its orientation angle. If a set for the generated keypoint descriptor is not available in a corresponding data bin, a new set is created to receive and store the generated keypoint descriptor. A set may hold up to a predetermined number of keypoint descriptors; and hence, when a set (e.g., set 1_1) in a data bin (e.g., data bin 1) is filled, a new set (e.g., set 1_2) is created to hold subsequent keypoint descriptors with orientation angles corresponding to the data bin (e.g., data bin 1). Not all sets may be filled, and some of the sets (e.g., set 1_A) may include fewer than the predetermined number of keypoint descriptors, and each of the data bins may have a different number of sets. The use of sets is advantageous, among other reasons, because the set can be used as a unit of keypoint generators to be later fetched for storing in local previous descriptor memory 426, as described below in detail with reference to FIGS. 7A and 7B.

In one or more embodiments, after a header of a descriptor of the previous image is loaded onto header match circuit 510, header match circuit 510 determines a data bin in current descriptor memory 410 corresponding to the orientation of the loaded header of the previous frame. Header match circuit 510 then loads only the headers of the keypoint descriptors of the current image from the corresponding bin and its adjacent bins for header match operation. For example, if the header of a keypoint of a previous image loaded onto header match circuit 510 indicates an orientation angle of 50 degrees, and assuming that data bins cover orientation angles in the increments of 45 degrees (e.g., data bin 1 starts from 0 to 45 degrees, data bin 2 covers 45 to 90 degrees, etc.), only headers of keypoint descriptors in corresponding data bin (e.g., data bin 2) and headers keypoint descriptors in adjacent data bins (e.g., data bins 1 and 3) are loaded from current descriptor memory 410 for comparison against the loaded keypoint of the previous image. In this way, fewer headers of keypoint descriptors of the current image in current descriptor memory 410 are received at header match circuit 510 and undergoes header match operations against the loaded header of previous image, which advantageously reduces the number of header matching operations in header match circuit 510.

Referring back to FIG. 5, buffer 520 receives and stores pointers 514 to a subset of keypoints in the current image and matching keypoints in the previous image based on their headers. Because the numbers of pairs of descriptors identified as potentially matching based on their headers in header match circuit 510 may not be consistent, buffer 520 temporarily stores pointers 514 of descriptors with headers that satisfy one or more criteria, and sends the pointers 514 sequentially to distance circuit 530. In one or more embodiment, buffer 520 is implemented as a first-in, first-out (FIFO) memory.

Distance circuit 530 is a circuit that determines a distance between a descriptor vector of a previous image and a descriptor vector of a current image. The distance may be, for example, a hamming distance between the descriptor vectors. The process and circuit for determining the distance of two vectors are well known in the art, and hence, their detailed description is omitted herein for the sake of brevity. Distance circuit 530 generates match information 534 as a result of its operation and stores it in match information storage 540.

For its operation, distance circuit 530 receives pointers 514 of pairs of keypoints in the current image and keypoints in the previous image using pointers 514. After determining a distance between a descriptor vector of a first keypoint in a previous image and a descriptor vector of a second keypoint in a current image, the distance circuit 530 generates or updates a first match entry for the first keypoint and a second match entry for the second keypoint. The two match entries collectively form a part of match information 534. The first match entry includes a field indicating a pointer to a best matching keypoint in the current image, and another field indicating the distance to the best matching keypoint in the current image. The first match entry may be updated each time the first keypoint is compared with another keypoint in the current image. Similarly, the second match entry includes a field indicating a pointer to a best matching keypoint in the previous image, and another field indicating the distance to the best matching keypoint in the previous image. Such match entries are generated and updated for each keypoints identified by pointers 514, and stored in match information storage 540.

Match selector circuit 550 determines and outputs a list of matching pairs 418 of keypoints using match information. After distances for all pairs of keypoints in the previous image and keypoints in the current image are determined and stored in match information storage 540, match selector circuit 550 determines keypoints of the previous image having matching keypoints in the current image by analyzing first match entries and second match entries. In one or more embodiment, match selector circuit 550 determines a bi-directionally matching pair of keypoints by identifying a keypoint of a previous image as having its first match entry indicate a keypoint of a current image as the best match, and the same keypoint of the current image as having its second match entry indicate the same keypoint of the previous image as being the best match. When the best matching keypoint of the current image from the first match entry do not match the best matching keypoint of the previous image from the second match list, these keypoints are not bi-directionally matching, and hence, they are not included in the list 418.

The list of matching pairs 418 may be used by other components of ISP 206 to process images. For example, a current image and a previous image may be warped and fused using the pairs of keypoints to generate a noise-reduced version of the current image.

Example Loading and Processing of Descriptors of Previous Image

Figure 7A:
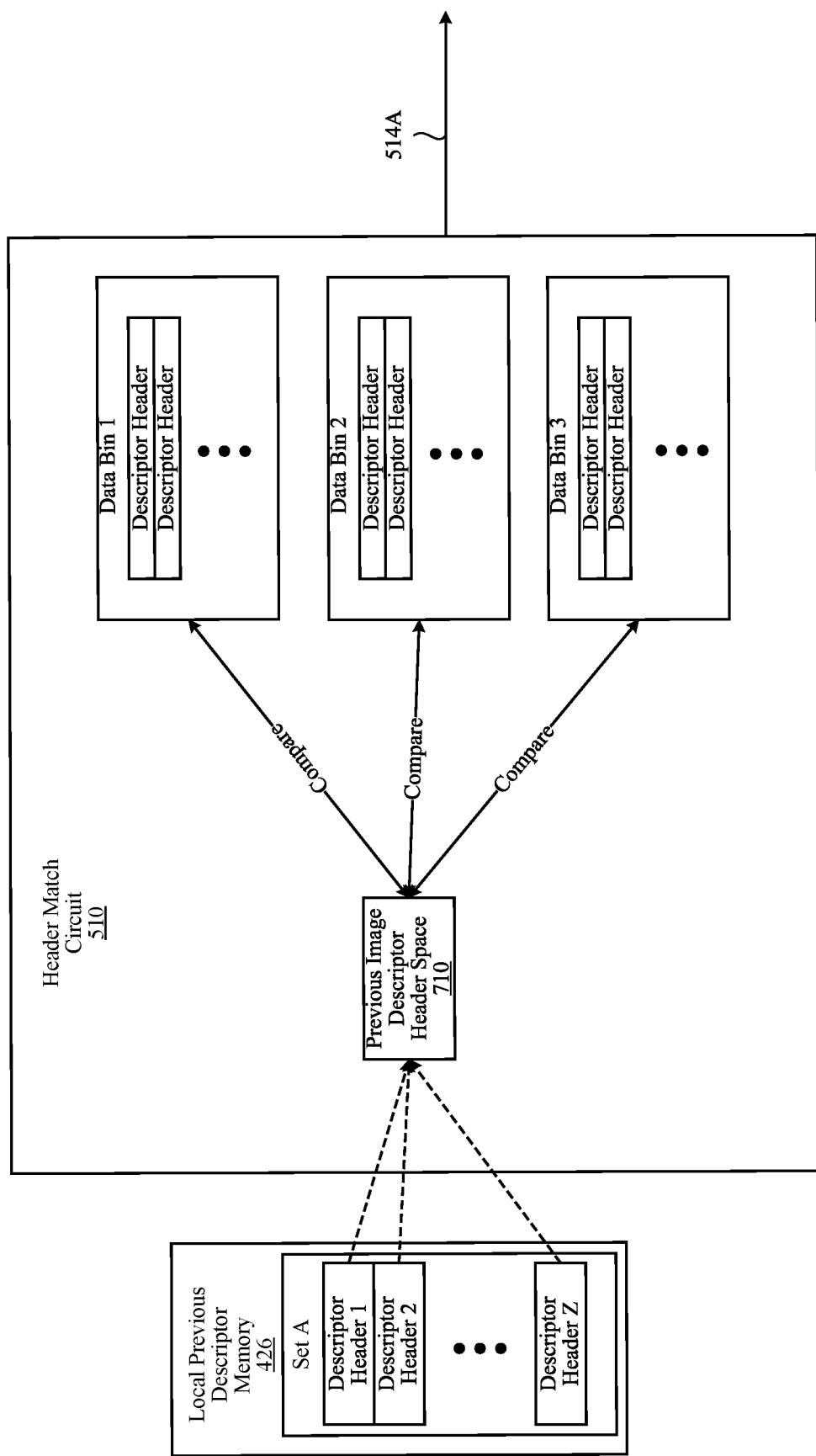
FIGS. 7A and 7B are conceptual diagrams illustrating operations performed by a header match circuit of the descriptor match circuit, according to one embodiment.
Figure 7B:
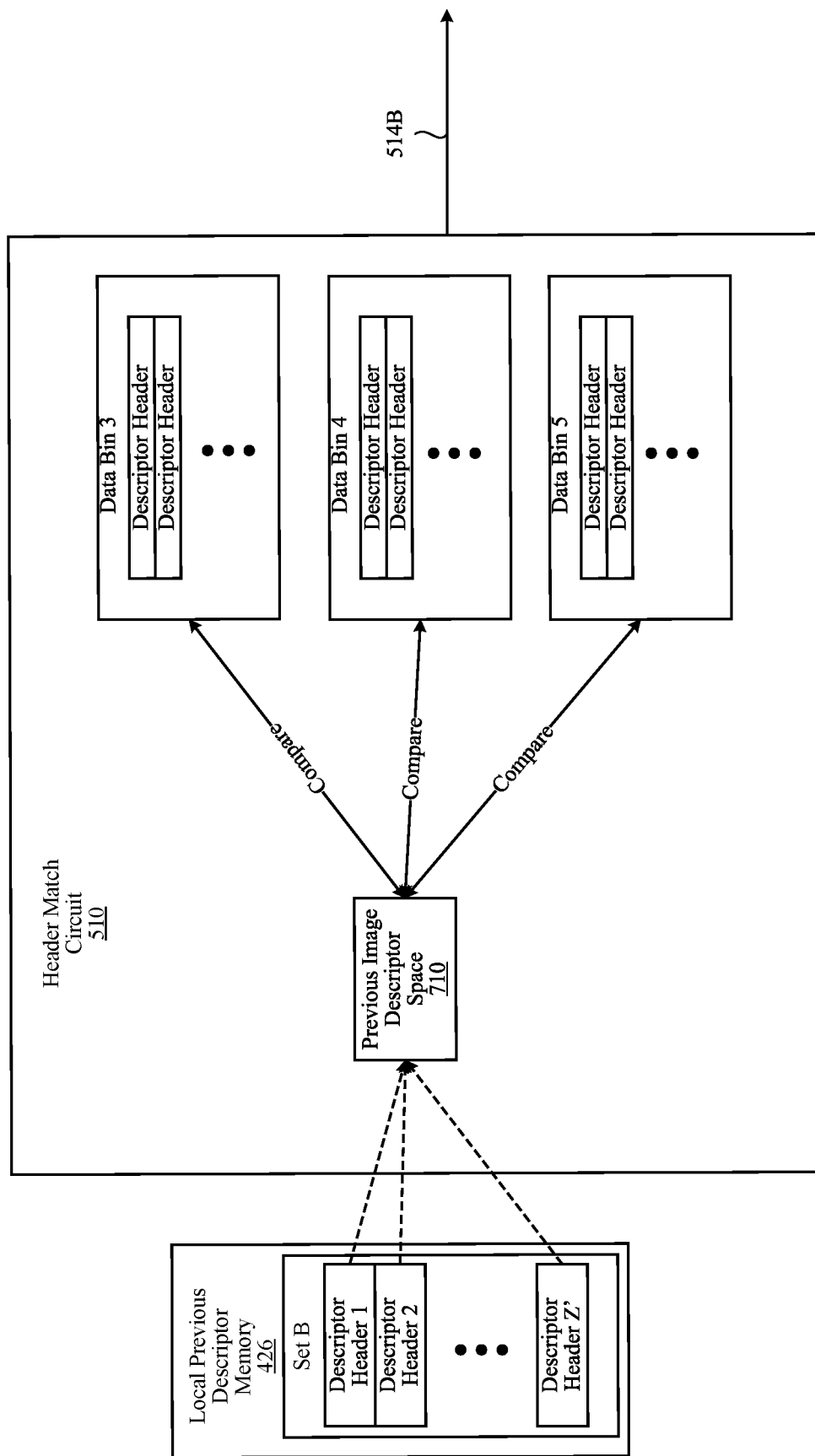

FIGS. 7A and 7B are conceptual diagrams illustrating operations performed by header match circuit 510, according to one embodiment. To reduce the data traffic associated with receiving keypoint descriptors of the previous image from system memory 230, a keypoint descriptor of the previous image may be received only once from system memory 230. In one or more embodiments, a set of keypoint descriptors is received from system memory 230 as a unit where each set includes up to a predetermined number of keypoint descriptors.

In FIG. 7A, set A of descriptors is illustrated as being stored in local previous descriptor memory 426. In this example, set A includes descriptors with headers indicating orientation angles that fall within an orientation angle range that corresponds to data bin 2 (e.g., covering orientation angles over 45 degrees but not over 90 degrees). The descriptor headers of keypoints in the previous image are sequentially loaded onto previous image descriptor header space 710 of header match circuit 510. After a header of the descriptor of the previous image is loaded onto previous image descriptor header space 710 of head match circuit 510, header match circuit performs match compare operations using one or more criteria against all headers of the descriptors in data bins 1 through 3 of current descriptor memory 410. Headers of descriptors in remaining data bins are not loaded onto header match circuit 510 for compare operations with the headers of descriptors in set A to reduce the number of header compare operations.

Because the descriptors of the current image are all locally stored in current descriptor memory 410 within vision module 322, the headers of the descriptors of the current image may be loaded efficiently onto header match circuit 510 multiple times for compare operations against any header of the previous image. In contract, the descriptors of the previous image are retrieved from system memory 230 external to vision module 322, which consumes more time and bandwidth to system memory 230. Hence, it is advantageous to reduce the number of times the descriptors of the previous image are loaded from system memory 230 while loading the descriptors of the current image multiple times.

After performing a match compare operation on last descriptor header Z in set A, set B is loaded onto local previous descriptor memory 426 as illustrated in FIG. 7B. Set B includes descriptors of the previous image with their orientation angles corresponding to an orientation angle range of data bin 4 (e.g., covering orientation angles over 135 degrees but not over 180 degrees). The headers of descriptors of the previous image are also sequentially loaded onto previous image descriptor header space 710 of header match circuit 510, and match compare operations are performed against the headers of descriptors of data bins 3 through 5 in current descriptor memory 410. The headers of descriptors in remaining data bins are not loaded onto header match circuit 510 for compare operations with the headers of descriptors in set B.

After the last descriptor of set B is loaded onto header match circuit 510 and compared against all headers of the descriptors in data bins 3 through 5, a subsequent set of descriptors of the previous image (not shown) is loaded and repeated again until all the sets of descriptors of the previous image are processed by header match circuit 510. Then, the process may proceed to performing match compare operations on a next image.

Example Method of Comparing Headers Based on Orientation Angle Range

Figure 8:
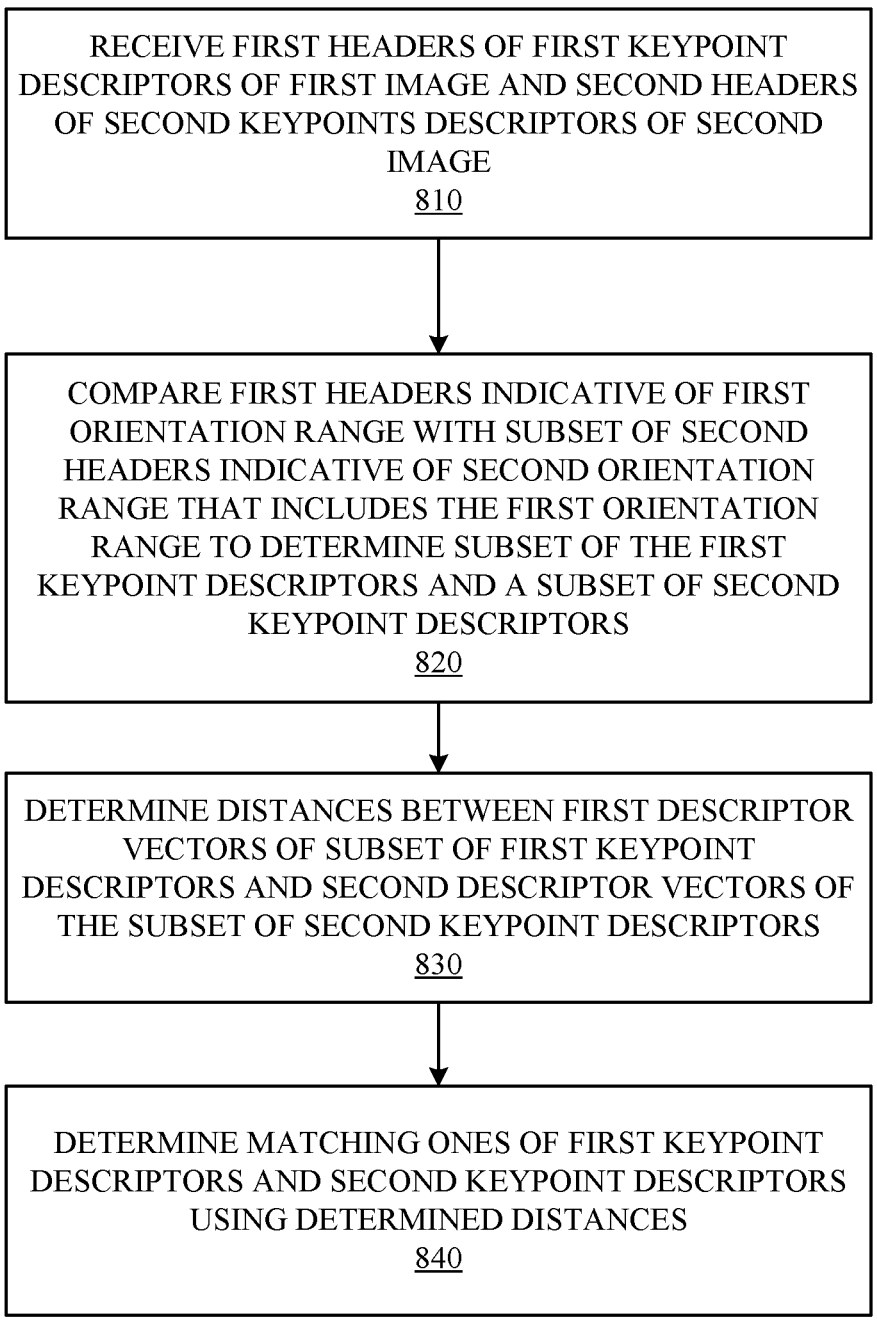
FIG. 8 is a flowchart illustrating a method for determining matching keypoints in two images, according to one embodiment.

FIG. 8 is a flowchart illustrating a method for determining matching keypoints in two images, according to one embodiment. First, first headers of first keypoint descriptors of a first image (e.g., previous image) and second headers of second keypoints descriptors of a second image (e.g., current image) are received 810 by header match circuit 510 of descriptor match circuit 414.

The first headers indicative of a first orientation angle range are compared 820 with a subset of the second headers indicative of a second orientation angle range that includes the first orientation angle range by header match circuit 510 of descriptor match circuit 414. As a result, a subset of the first keypoint descriptors and a subset of second keypoint descriptors that satisfy one or more matching criteria are determined. In one or more embodiments, the second orientation angle range may cover the first orientation angle range (e.g., 45 degrees to 90 degrees) and its adjacent orientation angle ranges (e.g., 0 to 45 degrees, and 90 to 135 degrees).

Then, distances between first descriptor vectors of the subset of first keypoint descriptors and second descriptor vectors of the subset of second keypoint descriptors are determined. 830 by distance circuit 530 of descriptor match circuit 414. As a result, match information is generated.

Matching pairs of the first keypoint descriptors and the second keypoint descriptors are determined 840 using the determined distances by match selector circuit 550 of descriptor match circuit 414.

The processes and their sequence as described above with reference to FIG. 8 are merely illustrative. Additional processes may be added or some of the processes may be performed in parallel. For example, the process of determining 830 the distances may be performed in parallel with the process of determining 840 matching pairs of keypoint descriptors.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A circuit for determining matching keypoints in images, comprising:
    a header match circuit configured to:
        receive first headers of first keypoint descriptors of a first image and second headers of second keypoints descriptors of a second image, and
        compare the first headers indicative of a first orientation angle range with a subset of the second headers indicative of a second orientation angle range that includes the first orientation angle range to determine a subset of the first keypoint descriptors and a subset of second keypoint descriptors that satisfy one or more matching criteria;
    a distance circuit coupled to the header match circuit and configured to determine distances between first descriptor vectors of the subset of first keypoint descriptors and second descriptor vectors of the subset of second keypoint descriptors; and a match selector circuit coupled to the distance circuit and configured to determine matching ones of the first keypoint descriptors and the second keypoint descriptors using the determined distances.

2. The circuit of claim 1, wherein the header match circuit does not compare the first headers against the second headers indicating orientation angles beyond the second orientation angle range.

3. The circuit of claim 1, wherein the header match circuit is configured to receive, in a cycle, a predetermined number of the first headers indicative of the first orientation angle range as a unit.

4. The circuit of claim 1, wherein each of the subset of the second headers is indicative of the first orientation angle range or orientation angle ranges adjacent to the first orientation angle range.

5. The circuit of claim 1, further comprising:
a keypoint descriptor generator circuit configured to generate the first keypoint descriptors during a first cycle and the second keypoint descriptors during a second cycle subsequent to the first cycle; and
a local descriptor memory between the keypoint descriptor generator circuit and the header match circuit, the local descriptor memory configured to store the first keypoint descriptors during the first cycle, and store the second keypoint descriptions during the second cycle.

6. The circuit of claim 5, wherein the local descriptor memory includes a plurality of data bins, each of the data bins configured to store the first keypoint descriptors of orientations of a predetermined orientation angle range during the first cycle and store the second keypoint descriptors of orientations of the predetermined orientation angle range during the second cycle.

7. The circuit of claim 6, wherein the plurality of the data bins storing the first keypoint descriptors are moved to an external memory after the first cycle for reading by the header match circuit in the second cycle.

8. The circuit of claim 6, wherein each of the data bins store one or more sets of the second keypoints, wherein each of the sets include fewer than a predetermine number of the second keypoints.

9. The circuit of claim 1, wherein the first keypoint descriptors and the second keypoint descriptors comprise Fast Retina Keypoint (FREAK) descriptors.

10. A method of determining matching keypoints in images, comprising:
receiving first headers of first keypoint descriptors of a first image and second headers of second keypoints descriptors of a second image;
comparing the first headers indicative of a first orientation angle range with a subset of the second headers indicative of a second orientation angle range that includes the first orientation angle range to determine a subset of the first keypoint descriptors and a subset of second keypoint descriptors that satisfy one or more matching criteria;
determining distances between first descriptor vectors of the subset of first keypoint descriptors and second descriptor vectors of the subset of second keypoint descriptors; and
determining matching ones of the first keypoint descriptors and the second keypoint descriptors using the determined distances.

11. The method of claim 10, wherein the second headers indicating orientation angles beyond the second orientation angle range are not compared against the first headers.

12. The method of claim 10, wherein a predetermined number of the first headers indicative of the first orientation angle range is received as a unit.

13. The method of claim 10, wherein each of the subset of the second headers is indicative of the first orientation angle range or orientation angle ranges adjacent to the first orientation angle range.

14. The method of claim 10, wherein the first keypoint descriptors are generated during a first cycle and the second keypoint descriptors are generated during a second cycle subsequent to the first cycle.

15. The method of claim 14, further comprising;
storing the first keypoint descriptors in a local descriptor memory during the first cycle; and
storing the second keypoint descriptions in the local descriptor memory during the second cycle.

16. The method of claim 15, wherein the local descriptor memory includes a plurality of data bins, each of the data bins configured to store the first keypoint descriptors of orientations of a predetermined during the first cycle and store the second keypoint descriptors of orientations of the predetermined orientation angle range during the second cycle.

17. The method of claim 16, further comprising moving the plurality of the data bins storing the first keypoint descriptors to an external memory after the first cycle for reading in the second cycle.

18. The method of claim 16, wherein each of the data bins store one or more sets of the second keypoints, wherein each of the sets include fewer than a predetermine number of the second keypoints.

19. The method of claim 10, wherein the first keypoint descriptors and the second keypoint descriptors comprise Fast Retina Keypoint (FREAK) descriptors.

20. An electronic device, comprising:
an image sensor configured to obtain a first image and a second image; and
a header match circuit coupled to receive the first image and the second image, and configured to:
receive first headers of first keypoint descriptors of the first image and second headers of second keypoints descriptors of a header match circuit configured to:
receive first headers of first keypoint descriptors in a first image and second headers of second keypoints descriptors in a second image, and
compare the first headers indicative of a first orientation angle range with a subset of the second headers indicative of a second orientation angle range that includes the first orientation angle range to determine a subset of the first keypoint descriptors and a subset of second keypoint descriptors that satisfy one or more matching criteria;
a distance circuit coupled to the header match circuit and configured to determine distances between first descriptor vectors of the subset of first keypoint descriptors and second descriptor vectors of the subset of second keypoint descriptors; and
a match selector circuit coupled to the distance circuit and configured to determine matching ones of the first keypoint descriptors and the second keypoint descriptors using the determined distances.

* * * * *